US011263286B2

(12) United States Patent
Brun et al.

(10) Patent No.: US 11,263,286 B2
(45) Date of Patent: Mar. 1, 2022

(54) SYSTEM AND METHOD FOR LEGACY-BASED ACCESS TO NON-LEGACY DATA

(71) Applicant: AMADEUS S.A.S., Biot (FR)

(72) Inventors: Pierre Brun, Valbonne (FR); Jean-Chafic Hays, Nice (FR); Fabien Bernard Blondet, Le Rouret (FR); Veronique Dupuy, Cannes (FR); Ludovic Vouriot, Biot (FR)

(73) Assignee: AMADEUS S.A.S., Biot (FR)

( * ) Notice: Subject to any disclaimer, the term of this patent is extended or adjusted under 35 U.S.C. 154(b) by 7 days.

(21) Appl. No.: 16/724,526

(22) Filed: Dec. 23, 2019

(65) Prior Publication Data
US 2021/0192006 A1 Jun. 24, 2021

(51) Int. Cl.
*G06F 17/00* (2019.01)
*G06F 16/958* (2019.01)

(52) U.S. Cl.
CPC .................................. *G06F 16/972* (2019.01)

(58) Field of Classification Search
None
See application file for complete search history.

(56) References Cited

U.S. PATENT DOCUMENTS

| 5,862,328 A | 1/1999 | Colyer | |
|---|---|---|---|
| 7,065,771 B1 | 6/2006 | Prabhu et al. | |
| 7,502,752 B1 * | 3/2009 | Lemons | G06Q 20/108 370/354 |
| 10,425,494 B2 * | 9/2019 | Strong | H04L 67/1097 |
| 10,545,981 B2 * | 1/2020 | Abnous | G06F 16/22 |
| 2002/0065645 A1 * | 5/2002 | Wall | G06F 8/10 703/22 |
| 2002/0085035 A1 * | 7/2002 | Orbanes | G06F 3/04815 715/764 |
| 2006/0170957 A1 * | 8/2006 | Niebling | H04N 1/2307 358/1.15 |
| 2006/0173865 A1 * | 8/2006 | Fong | G06F 40/151 |
| 2009/0164491 A1 * | 6/2009 | Cotichini | G06F 16/214 |
| 2009/0276413 A1 * | 11/2009 | Uchida | G06F 16/381 |
| 2012/0166212 A1 * | 6/2012 | Campbell | G06Q 10/10 705/2 |
| 2014/0181254 A1 * | 6/2014 | Liu | G06F 16/90 709/217 |
| 2015/0100667 A1 * | 4/2015 | Freyria | H04N 21/234309 709/219 |

(Continued)

FOREIGN PATENT DOCUMENTS

WO WO-2017103864 A1 * 6/2017 ............. G06Q 10/02

*Primary Examiner* — Mustafa A Amin
(74) *Attorney, Agent, or Firm* — Perry + Currier Inc.

(57) ABSTRACT

A method for legacy-based access to non-legacy data includes: receiving, at an intermediation server, a non-legacy data object containing non-legacy content; generating a legacy data object containing the non-legacy content, for storage in a repository; storing, in association with the legacy data object, a non-legacy distribution channel indicator; adjusting a legacy processing mechanism at the repository according to the non-legacy distribution channel indicator; receiving from a client subsystem, via a legacy interface, a request for the non-legacy content; and in response to the request, retrieving and sending the legacy data object containing the non-legacy content, via the legacy interface.

19 Claims, 6 Drawing Sheets

(56) References Cited

U.S. PATENT DOCUMENTS

| | | | |
|---|---|---|---|
| 2015/0347408 A1* | 12/2015 | Fontebride | G06F 16/24573 |
| | | | 707/638 |
| 2018/0189330 A1* | 7/2018 | Doan | G06F 16/2282 |
| 2018/0218368 A1* | 8/2018 | Rao | G06Q 20/405 |
| 2020/0104404 A1* | 4/2020 | Li | G06F 9/5055 |
| 2020/0159523 A1* | 5/2020 | Schaude | G06F 16/215 |
| 2020/0183899 A1* | 6/2020 | Xu | G06F 16/2365 |
| 2020/0250026 A1* | 8/2020 | Popelka | G06F 11/076 |
| 2020/0293541 A1* | 9/2020 | Pigeon | G06F 9/541 |

\* cited by examiner

SYSTEM AND METHOD FOR LEGACY-BASED ACCESS TO NON-LEGACY DATA

FIELD

The specification relates generally to computing systems, and specifically to a system and method for enabling legacy-based access to non-legacy data in such systems.

BACKGROUND

Computing systems may store and process data generated via a plurality of channels, e.g. employing distinct (and not necessarily compatible) communication protocols, messaging sequences, and the like. Such systems can include numerous distinct subsystems, some of which may be able to manipulate data (e.g. initiate processing operations, retrieve data for display and the like) only according to a subset of the above channels. Data generated via other channels may remain inaccessible to such subsystems.

SUMMARY

An aspect of the specification provides a method for legacy-based access to non-legacy data, the method comprising: receiving, at an intermediation server, a non-legacy data object containing non-legacy content; generating a legacy data object containing the non-legacy content, for storage in a repository; storing, in association with the legacy data object, a non-legacy distribution channel indicator; adjusting a legacy processing mechanism at the repository according to the non-legacy distribution channel indicator; receiving from a client subsystem, via a legacy interface, a request for the non-legacy content; and in response to the request, retrieving and sending the legacy data object containing the non-legacy content, via the legacy interface.

Another aspect of the specification provides an intermediation server, comprising: a memory storing a repository; a communications interface; and a processor connected with the communications interface and the memory, the processor configured to: receive, via the communications interface, a non-legacy data object containing non-legacy content; generate a legacy data object containing the non-legacy content; store, in association with the legacy data object, a non-legacy distribution channel indicator; adjust a legacy processing mechanism at the repository according to the non-legacy distribution channel indicator; receive from a client subsystem, via a legacy interface, a request for the non-legacy content; and in response to the request, retrieve and send the legacy data object containing the non-legacy content, via the legacy interface.

A further aspect of the specification provides a non-transitory computer-readable medium storing computer-readable instructions executable by a processor of an intermediation server to: receive, via a communications interface, a non-legacy data object containing non-legacy content; generate a legacy data object containing the non-legacy content; store, in association with the legacy data object, a non-legacy distribution channel indicator; adjust a legacy processing mechanism at the repository according to the non-legacy distribution channel indicator; receive from a client subsystem, via a legacy interface, a request for the non-legacy content; and in response to the request, retrieve and send the legacy data object containing the non-legacy content, via the legacy interface.

BRIEF DESCRIPTIONS OF THE DRAWINGS

Embodiments are described with reference to the following figures, in which.

Figure 3:
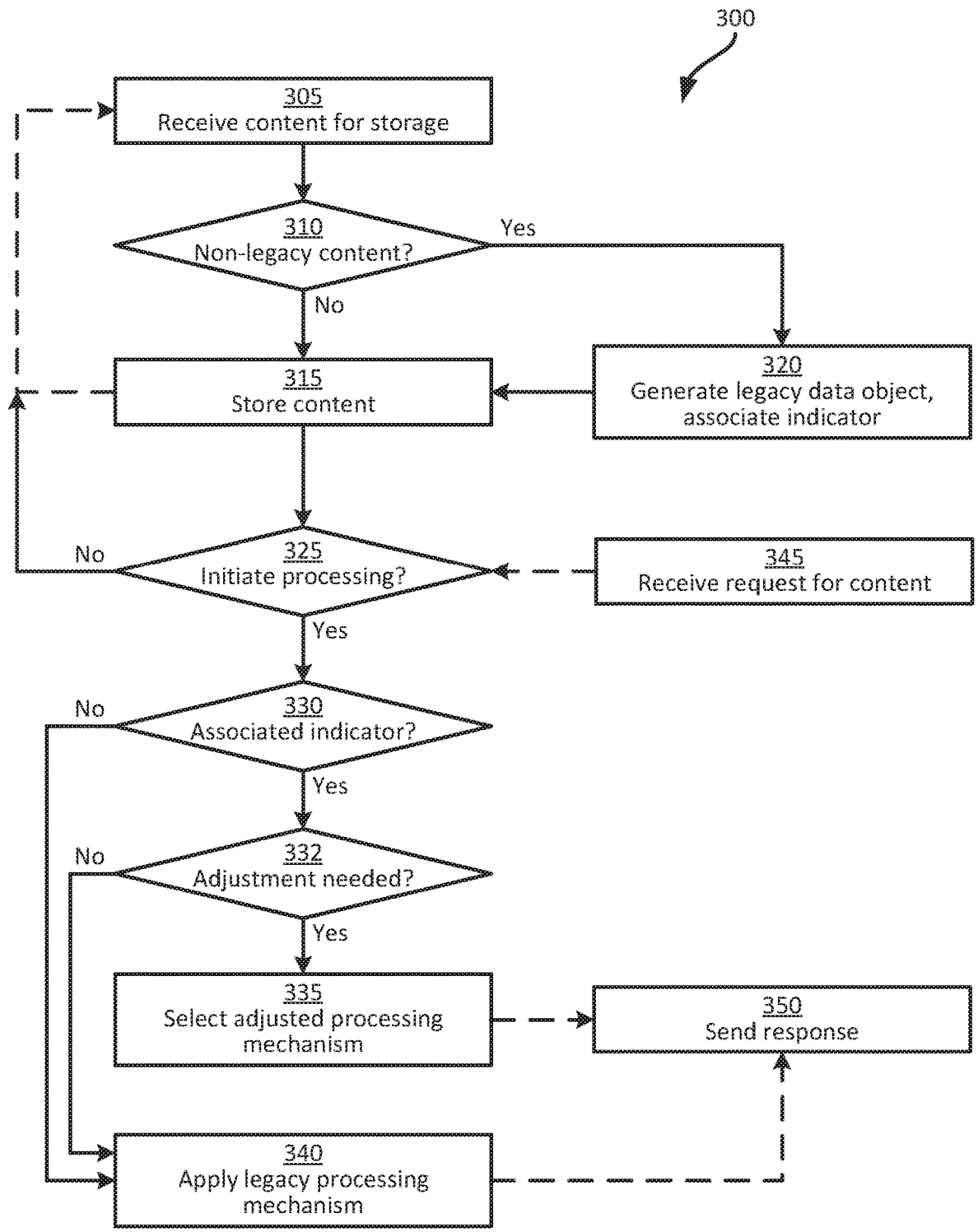
FIG. 3 is a flowchart of a method for enabling legacy-based access to non-legacy data.
Figure 5:
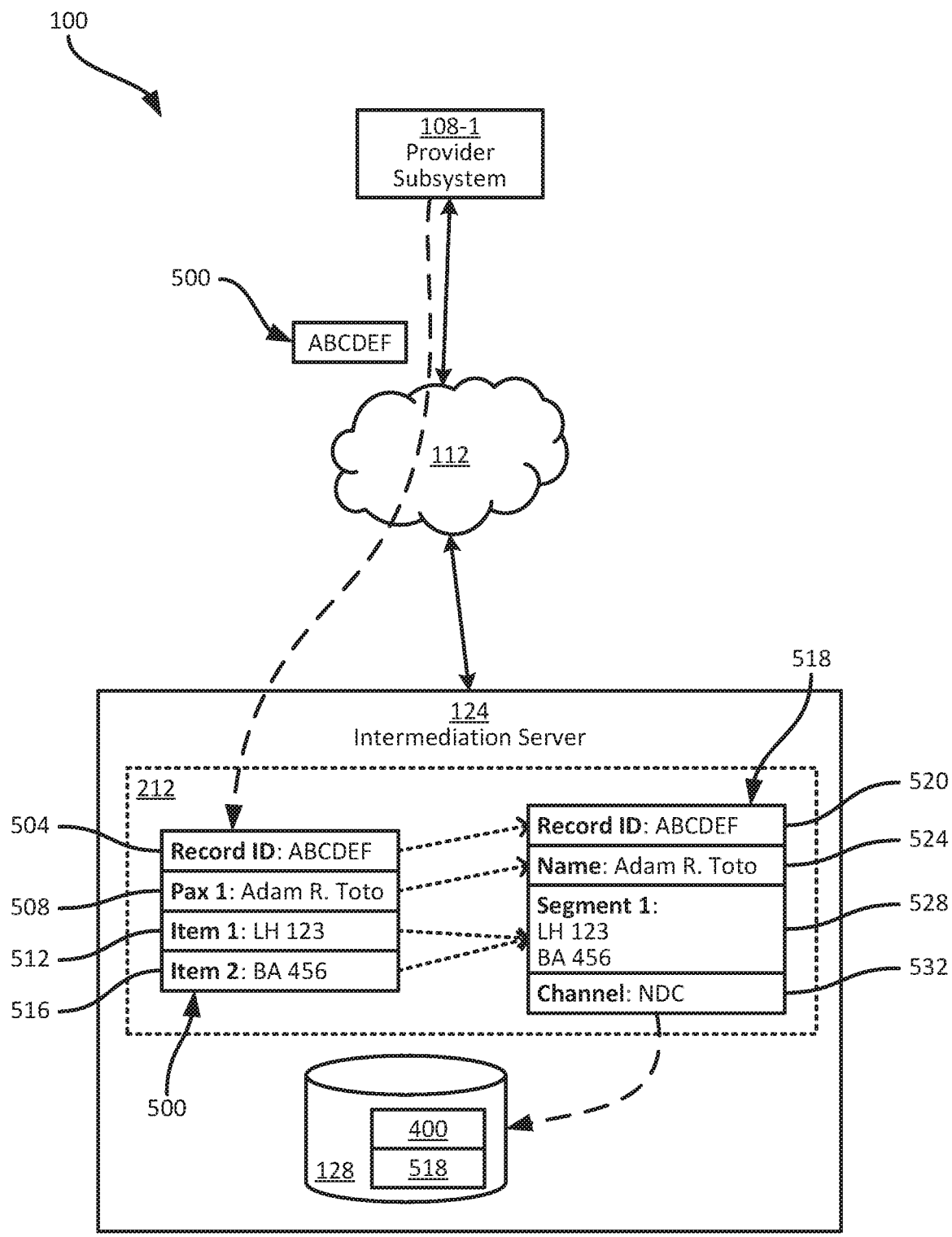
Figure 6:
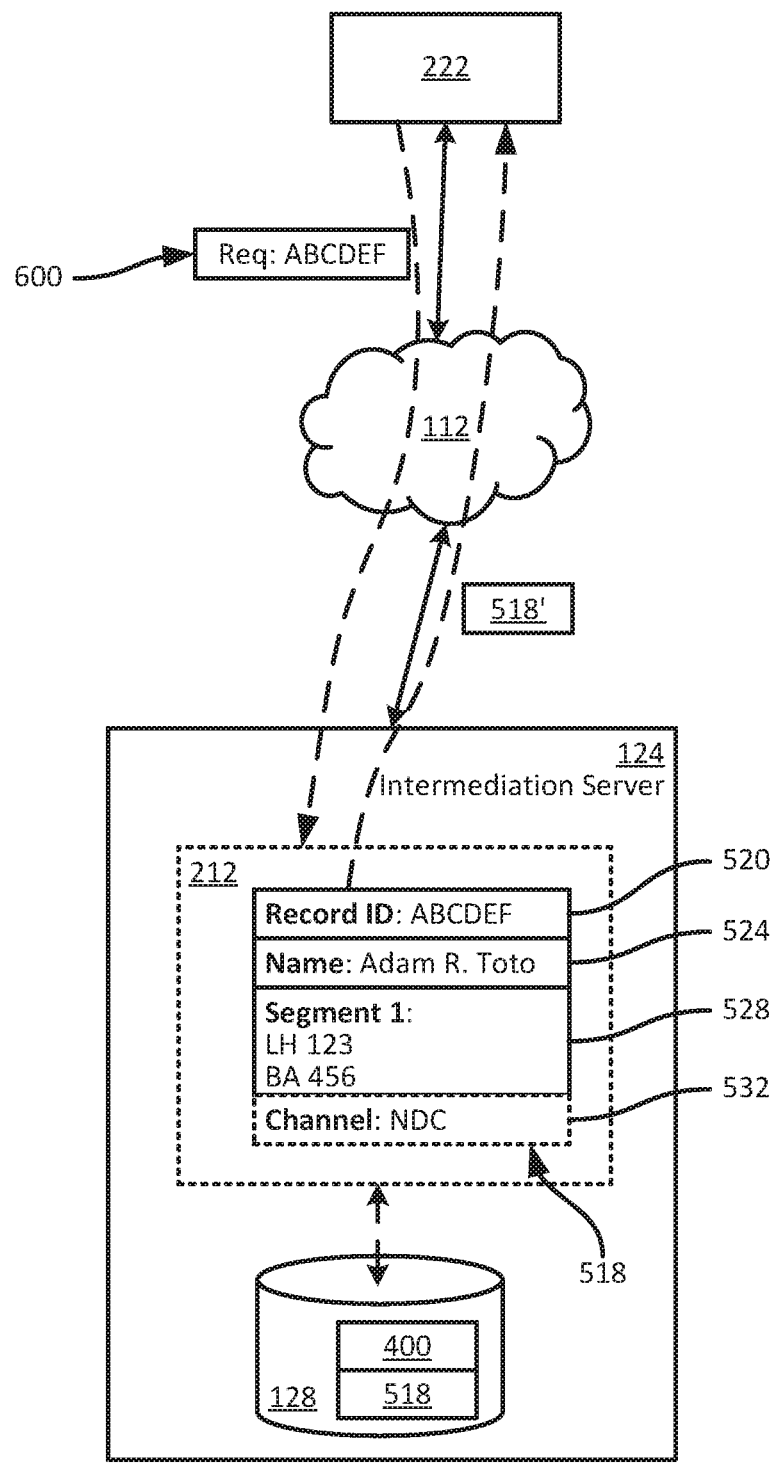

FIG. 5 is a diagram illustrating a performance of blocks 305, 310, 320 and 315 of the method of FIG. 3; and FIG. 6 illustrates an example performance of blocks 345, 325, 330, 335 and 350 of the method of FIG. 3.

DETAILED DESCRIPTION

Figure 1:
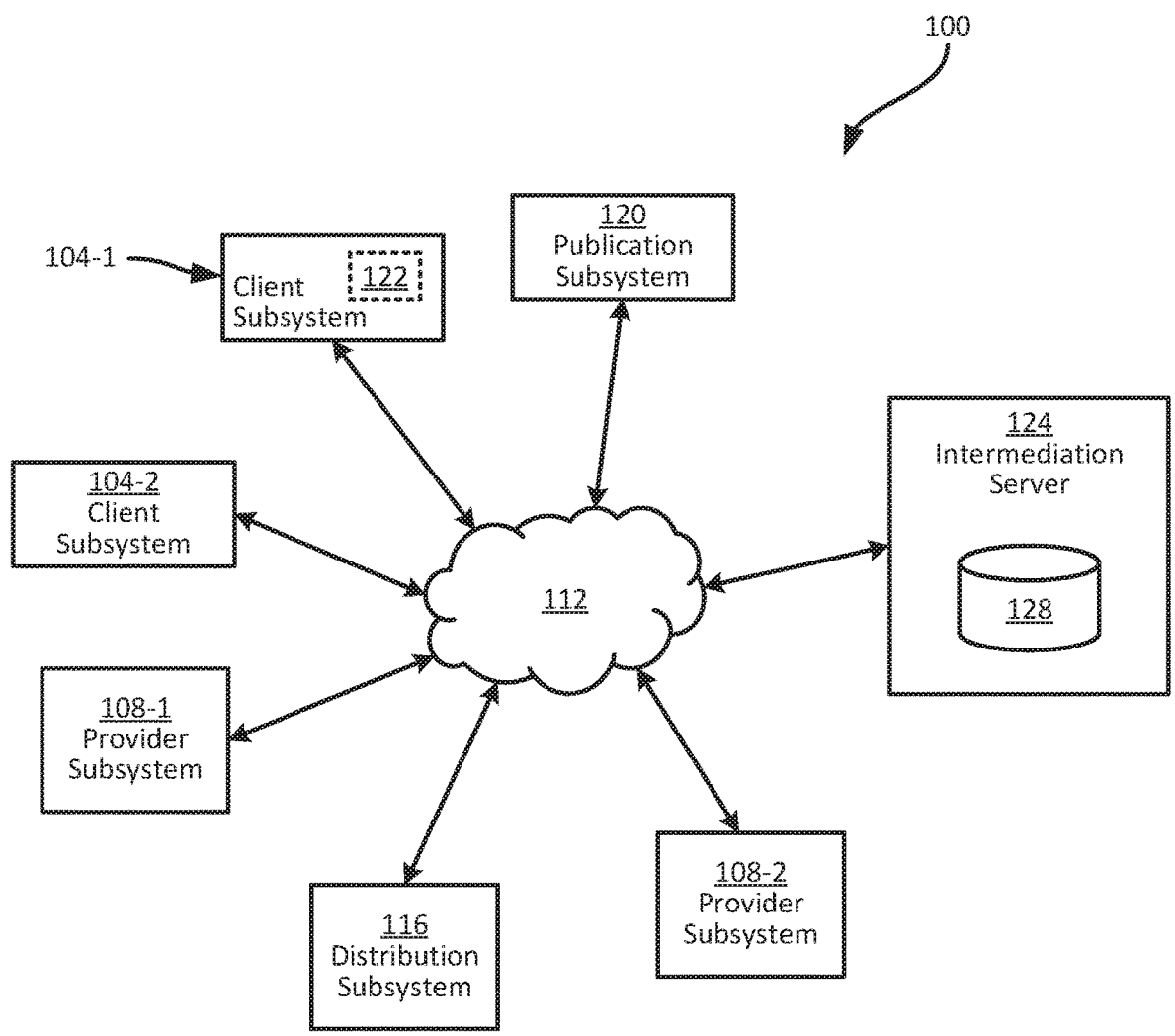
FIG. 1 is a diagram illustrating a system for enabling legacy-based access to non-legacy data.

FIG. 1 depicts a system 100 for integrating enabling legacy-based access to non-legacy data. Within the system 100, various computing subsystems interact to generate and process data relating to any of a wide variety of activities. In the examples discussed below, the subsystems of the system 100 interact to generate and process data relating to the delivery of items to customers. The items, in the examples, below, are travel-related products and services, such as flight tickets, hotel reservations, vehicle rental reservations, and the like. A wide variety of other activities can be enabled by the exchange of data between the subsystems shown of the system 100, and the specific nature of the data processed within the system 100 is not particularly limited.

In the illustrated example, the system 100 includes at least one client subsystem 104, of which two examples 104-1 and 104-2 are shown in FIG. 1 (referred to collectively as the client subsystems 104 and generically as a client subsystem 104). Each client subsystem 104 is operated by a client entity that may also be referred to as a seller. The seller can be, for example, a travel agency. The client subsystems 104 generate requests, e.g. on behalf of customers, for travel items. The requests specify various attributes of the travel items, such as origin and destination locations, times and dates of travel, and the like. Responses to requests from the client subsystems 104 are generated by, or on behalf of, entities that provide the items, referred to herein as providers. Therefore, in the present example the providers are entities such as airlines, hotel operators or the like that deliver the items to the customer, or to other such entities for eventual delivery to the customer, following purchase of the items (such purchase being effected, for example, via a client subsystem 104).

Each provider entity operates a provider subsystem 108; two example provider subsystems 108-1 and 108-2 are shown in FIG. 1. Each of the client subsystems 104 and the provider subsystems 108 are implemented as at least one computing device with input and output assemblies and communications devices for exchanging data via a network 112. The network 112 can include any suitable combination of local-area and wide-area networks, including the Internet. Although a two client subsystems 104 and two provider subsystems 108 are shown in FIG. 1, the system 100 can include a greater or smaller number of client subsystems 104 and provider subsystems 108 in other examples.

The generation of responses to requests from the client subsystems 104 can take various forms. In the illustrated example, the provider subsystem 108-1 is assumed to generate responses to such requests locally, although as will be seen below, the requests are not transmitted directly from the client subsystem 104 to the provider subsystem 108-1. That is, the provider subsystem 108-1 includes an offer generation module (e.g. computer readable instructions and corresponding execution hardware, along with various stored data for use in generating responses) that enables the provider subsystem 108-1 to generate response data based on the attributes specified in the request originated by a client subsystem 104. The response data may also be referred to as "offer data", and defines one or more items that match or partially match the requested attributes.

Other provider subsystems 108, such as the provider subsystem 108-2 in the present example, may not generate responses to requests from the client subsystem 104. Instead, such responses may be generated by a distribution subsystem 116. The provider subsystem 108-2 may, for example, publish data defining the items offered by the provider entity that operates the provider subsystem 108-2 to a publication subsystem 120. The publication subsystem 120 may be operated by a third party (i.e. distinct from the above-mentioned provider entities), and may receive published item data such as flight schedules, fares and the like, from one or more provider subsystems 108. The distribution subsystem 116, in turn, may retrieve data from the publication system 120 for use in generating responses to requests from the client subsystems 104 on behalf of the provider subsystem 108-2.

The distinct response generation mechanisms mentioned above may be implemented using different sets of communication protocols, data exchange standards, and the like. The collection of communication protocols, standardized data formats and the like that define how response data is generated for a client request may be referred to as the distribution channel according to which that request is handled.

As will be apparent to those skilled in the art, in the context of travel items, an example distribution channel is New Distribution Capability (NDC). The NDC standard defines an eXtensible Markup Language (XML) based data format, as well as message syntax, API calls and the like, for messages exchanged between client subsystems 104 and provider subsystems 108. In the present example, the provider subsystem 108-1, which generates response data locally, is assumed to employ the NDC channel. The NDC channel is also referred to herein as a non-legacy distribution channel, and content (i.e. data defining items) obtained via the NDC channel is referred to as non-legacy content. That is, the non-legacy content is obtained via NDC messaging.

Another example distribution channel in the context of travel items is a Global Distribution System (GDS) channel. Components of the system 100 that implement the GDS channel, such as the distribution subsystem 116 and the provider subsystem 108-2 in the illustrated example, employ message syntax, sequencing and the like that is distinct from that used under NDC. For example, the GDS channel may employ message syntax, sequence and the like as specified by the Electronic Data Interchange For Administration, Commerce and Transport (EDIFACT) standard. The GDS channel is also referred to herein as a legacy distribution channel, and content (i.e. data defining items) obtained via the GDS channel is referred to as legacy content. That is, the legacy content is obtained via GDS messaging.

In other words, response data (i.e. the above-mentioned content) can be generated within the system 100 using two or more distinct generation mechanisms, or distribution channels. Certain client subsystems 104 may be configured to obtain response data only via one channel (and not the other). Further, the client subsystems 104 may include internal components that are only compatible with one distribution channel. For example, the client subsystem 104-1 may be configured to obtain response data via either channel, but includes an accounting engine 122 that is only compatible with data obtained via the GDS channel (i.e. with legacy content). A wide variety of such internal components may be included in each client subsystem 104, and at least some of those internal components may have been deployed with legacy content compatibility only.

Client subsystems 104 may be configured to obtain both legacy and non-legacy content, such as a first flight for a given customer obtained via the GDS channel and a second flight for that customer obtained via the NDC channel. To enable client subsystems 104 to view and manipulate both legacy and non-legacy content together, some systems implement a shared data storage and handling mechanism, with a shared set of formatting standards, API calls, and the like. However, such systems do not address the limited compatibility of components such as the engine 122: the shared storage and handling mechanisms differ from legacy mechanisms, and the engine 122 is therefore unable to use such shared mechanisms without potentially costly modifications.

The system 100 is therefore configured to enable components such as the engine 122 to access non-legacy data (as well as legacy data) using legacy access mechanisms. The functionality discussed herein enables the engine 122 and other legacy-compatible components to continue functioning with fewer or no technical modifications to implement non-legacy compatibility.

To that end, the system 100 includes an intermediation server 124 (also referred to herein simply as the server 124) connected with the network 112. Requests generated by the client subsystems 104 are transmitted via the network 112 to the intermediation server 124. The intermediation server 124 receives requests from the client subsystems 104, and passes such requests to the provider subsystems 108 and/or the distribution subsystem 116. The intermediation server 124 also receives responses from the provider subsystems 108 and/or distribution subsystem 116, for return to the client subsystem 104.

The responses mentioned above (i.e. the content) are stored in a repository 128 at the server 124. In particular, as will be discussed in greater detail below, content obtained via either distribution channel is stored in the repository 128 in legacy data objects. The storage of content obtained via both legacy and non-legacy distribution channels in legacy data objects enables components such as the engine 122 to retrieve and process non-legacy data with little or no modifications.

In addition, the server 124 is configured to apply various forms of legacy processing mechanisms to data in the repository 128. However, as noted above the repository 128 can also contain non-legacy content for which the legacy processing mechanisms may not be suitable. Although non-legacy content is stored in the repository 128 in legacy data objects, interactions with external entities such as the provider subsystem 108-1 to update the non-legacy content is still performed according to the non-legacy (e.g. NDC) distribution channel. The server 124 is therefore also configured to track which content in the repository 128 is non-legacy content (i.e. originated through the non-legacy distribution channel). The server 124 can also, based on such tracking, adjust legacy processing mechanisms for non-legacy content.

Before further discussion of the functionality of the various components of the system 100, certain internal components of the intermediation server 124 will be described in connection with FIG. 2.

Figure 2:
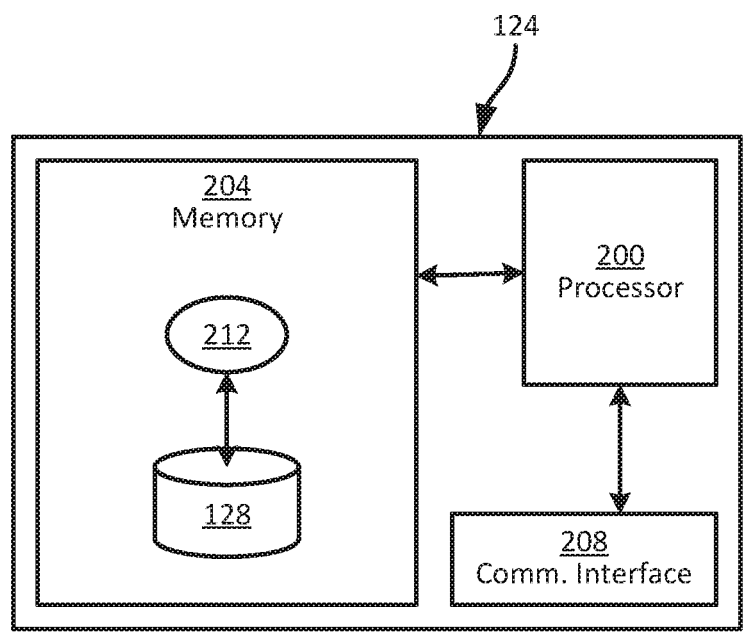
FIG. 2 is a diagram illustrating certain internal components of the intermediation server of FIG. 1.

Turning to FIG. 2, the intermediation server 124 includes at least one processor 200, such as a central processing unit (CPU) or the like. The processor 200 is interconnected with a memory 204, implemented as a suitable non-transitory computer-readable medium (e.g. a suitable combination of non-volatile and volatile memory subsystems including any one or more of Random Access Memory (RAM), read only memory (ROM), Electrically Erasable Programmable Read Only Memory (EEPROM), flash memory, magnetic computer storage, and the like). The processor 200 and the memory 204 are generally comprised of one or more integrated circuits (ICs).

The processor 200 is also interconnected with a communication interface 208, which enables the server 124 to communicate with the other computing devices of the system 100 via the network 112. The communication interface 208 therefore includes any necessary components (e.g. network interface controllers (NICs), radio units, and the like) to communicate via the network 112. The specific components of the communication interface 208 are selected based on the nature of the network 112. The server 124 can also include input and output devices connected to the processor 200, such as keyboards, mice, displays, and the like (not shown).

The components of the server 124 mentioned above can be deployed in a single enclosure, or in a distributed format. In some examples, therefore, the server 124 includes a plurality of processors, either sharing the memory 204 and communication interface 208, or each having distinct associated memories and communication interfaces.

The memory 204 stores the repository 128, as well as computer-readable instructions executable by the processor 200 to implement various functionality. The computer-readable instructions may also be referred to as applications, and in the illustrated example the memory 204 stores a content handling application 212 (also referred to herein simply as the application 212). In the description below, the processor 200, and more generally the server 124, are said to perform, or to be configured to perform, those actions. It will be understood that they are so configured via the execution (by the processor 200) of the instructions of the applications stored in memory 204, including the application 212.

Execution of the application 212 by the processor 200 configures the server 124 to obtain data via either of the above-mentioned distribution channels, and to store the data in the repository 128. Execution of the application 212 also configures the server 124 to adjust legacy processing mechanisms performed on records in the repository 128, based on the distribution channel by which the records were obtained. An example of a processing mechanism is the handling of a record in the repository 128 in response to a request for the record from a client subsystem 104. Certain other example processing mechanisms will also be discussed below.

Turning now to FIG. 3, certain aspects of the operation of the system 100 will be described in greater detail. Specifically, FIG. 3 illustrates a method 300 of providing access to non-legacy data using legacy-based access mechanisms. The performance of the method 300 will be discussed in conjunction with its performance within the system 100, and specifically by the intermediation server 124 via execution of the integration application 212.

At block 305, the server 124 receives content for storage in the repository 128. The receipt of content can be preceded by a variety of other actions that are outside the scope of the present discussion. In brief, the server 124 can receive a request for content (e.g. a request for data defining purchasable travel items) from a client subsystem 104. The server 124 can then relay the request to the relevant entity in the system 100, such as the provider subsystem 108-1 and the distribution subsystem 116. The server 124 can then receive at least one response from the entity or entities to which the request was relayed, for processing at block 305.

At block 310 the server 124 determines whether the content received at block 305 is non-legacy content. That is, the server 124 determines whether the content from block 305 was obtained according to the legacy distribution channel (e.g. by interacting with the distribution subsystem 116) or according to the non-legacy distribution channel (e.g. by interacting with the provider subsystem 108-1). The determination at block 310 can be based on the entity or entities from which the server 124 received the content, the message syntax, API calls or the like used to receive the content, and the like. For example, the server 124 can store configuration settings indicating the content type for each provider subsystem 108.

When the determination at block 310 is negative, indicating that the content received at block 305 is legacy content (e.g. obtained via the GDS distribution channel in the present example), the server 124 proceeds to block 315. At block 315 the content received at block 305 is stored in the repository 128. In the case of legacy content, storage at block 315 need not involve any modification of the content, because the records of the repository 128 are formatted according to the legacy distribution channel.

Figure 4:
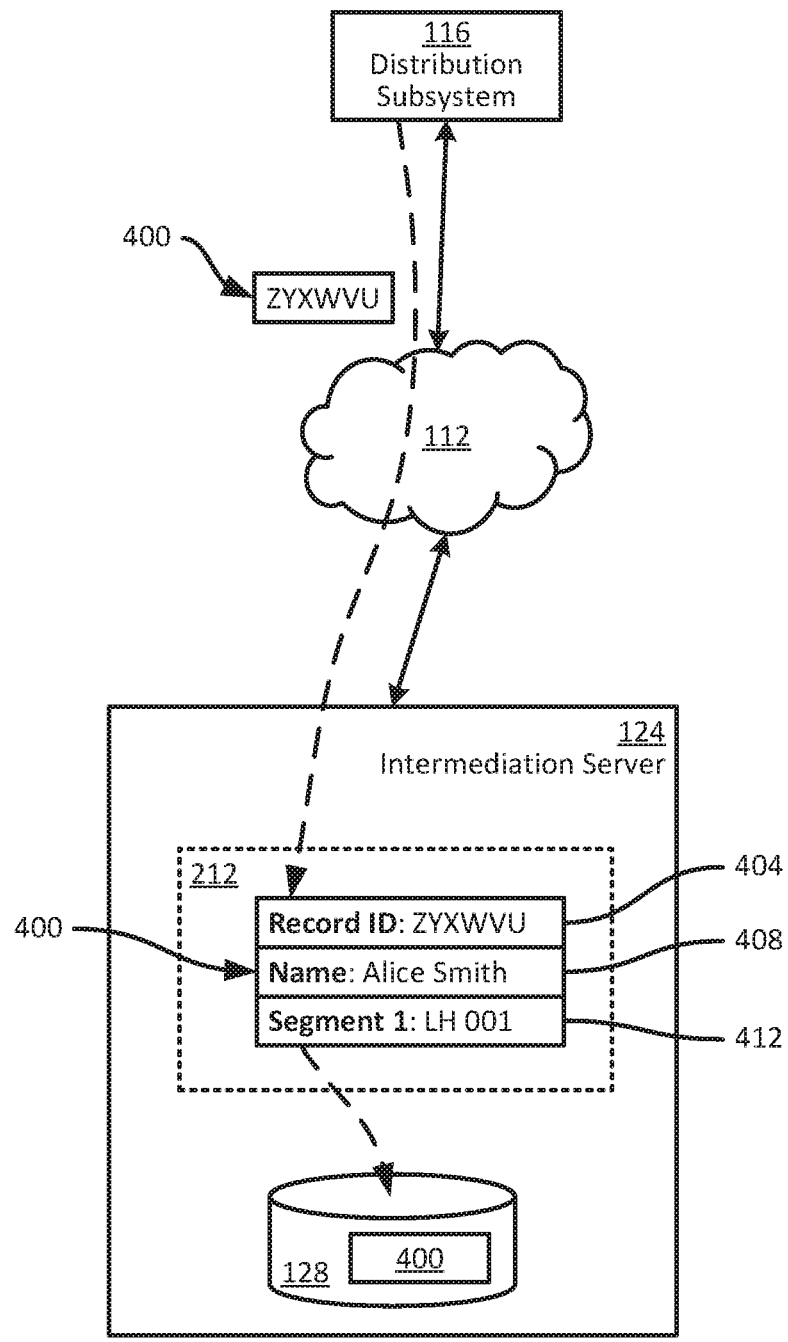
FIG. 4 is a diagram illustrating a performance of blocks 305, 310 and 315 of the method of FIG. 3.

Turning to FIG. 4, an example performance of blocks 305, 310 and 315 is shown. In particular, the distribution subsystem 116 is shown transmitting content in the form of a legacy data object 400 to the server 124 via the network 112. The legacy data object 400 can be, for example, a record containing data acquired through the EDIFACT process, as noted earlier. At block 310, the determination is negative, and thus at block 315 the server 124 stores the legacy data object 400 in the repository 128.

The contents of the data object 400 are shown within the dashed box indicating processing via execution of the application 212. In the illustrated example, the data object 400 includes a record identifier field 404, a name field 408, and an item definition field 412. A wide variety of additional fields can be included in the data object 400. As will be apparent to those skilled in the art, the data object 400 is a simplified example of a Passenger Name Record (PNR) as employed in GDS-based distribution channels. In addition, the data object 400 can be stored in the repository 128 in the form in which the data object 400 was received from the distribution subsystem 116.

Referring again to FIG. 3, following the performance of block 315 the server 124 can return to block 305 to receive additional content, as indicated by the dashed line from block 315 to block 305. More generally, the performance of blocks 305-315 (and of block 320, discussed below) can be repeated both before the remainder of the method 300 is performed, and during the performance of the remainder of the method 300. That is, blocks 305-320 indicate how the server 124 receives and processes content for storage in the repository 128, while the remaining blocks of the method 300 indicate how content already stored in the repository 128 may be processed. Receipt of content for storage and processing of stored content can be decoupled from one another.

When the determination at block 310 is affirmative, indicating that the content received at block 305 is non-legacy content (e.g. obtained via the NDC channel in the present example), the server 124 proceeds to block 320 before block 315. At block 320, the server 124 generates a legacy data object that contains the content received at block 305. In other words, block 320 involves a translation of non-legacy content into a legacy format for storage in the repository 128. The server 124 also, at block 320, generates a distribution channel indicator associated with the legacy data object containing non-legacy content.

Turning to FIG. 5, an example performance of blocks 305, 310, 320 and 315 is illustrated. The example actions shown in FIG. 5 are assumed to take place after the performance of blocks 305-315 discussed above in connection with FIG. 4, and the data object 400 is therefore shown in the repository 128.

In the example illustrated in FIG. 5, at block 305 the server 124 receives a non-legacy data object 500 from the provider subsystem 116-1. The data object 500 can include data acquired via a message formatted according to the NDC standard, such as an NDC Order message containing data defining one or more items booked on behalf of a customer. As shown in FIG. 5, the data object 500 includes a record identifier field 504, a passenger name field 508, and at least one item field. In the present example, two item fields 512 and 516 are shown, each containing data defining a flight. The non-legacy data object 500 can also include various other fields, defining various other products or services and related information. For example, the data object 500 can be an NDC OrderItem object including data such as an OrderItem identifier and the like, which may not have direct analogues in legacy data objects.

Following an affirmative determination at block 310, the server 124 proceeds to block 320 to generate a legacy data object 518 from the non-legacy content in the data record 500. In particular, the application 212 can include mapping rules or the like that specify fields of a legacy data object that correspond to fields of a non-legacy data object. An example mapping is illustrated in FIG. 5 by dashed lines between the fields 504-516 of the data object 500 and corresponding fields of the legacy data object 518. In particular, the record identifier field 504 corresponds to a record identifier field 520. Similarly, the passenger name field corresponds to a name field 524. The item fields 512 and 516 are combined into a single segment field 528 (which may also be referred to as an air segment for GDS content). That is, the server 124 can be configured to retrieve data from any item fields 512, 516, etc. in the non-legacy data object 500, and insert that data into subfields or any other suitable data structure in a single segment field 528. In other examples, the translation of a non-legacy data object to a legacy data object need not include the merging of fields as illustrated in FIG. 5. Instead, in other examples one or more fields of the non-legacy data record 500 may be split into multiple corresponding fields in the legacy data record 518.

As will now be apparent, the fields 520-528 are structurally aligned with the fields 404-412 shown in FIG. 4. That is, with an exception noted below, the content of the non-legacy data object 500 is translated, via block 320, into a format suitable for storage as a legacy data object. The above-mentioned exception includes the generation and storage of a distribution channel indicator corresponding to the legacy data object 518. In some implementations, additional exceptions include storage of links between fields of the data objects 500 and 518 generated during the translation process. Such links can be stored in the legacy data object 518 itself, or in a separate repository. The distribution channel indicator, which in the illustrated example is the string "NDC", indicates that the content in the legacy data object 518 was obtained via a non-legacy mechanism such as the NDC distribution channel. The indicator can be stored in a distribution channel indicator field 532 of the data object 518.

Of note, the legacy data object 400 does not include such an indicator. More generally, data objects containing legacy content need not be associated with such an indicator, although in other embodiments, all data objects in the repository 128 can include distribution channel indicators (e.g. "NDC" for non-legacy content and "GDS" for legacy content).

In other examples, the distribution channel indicator can be stored independently of the data object 518, such as in a distinct index identifying which records in the repository 128 are associated with a non-legacy distribution channel.

Following generation of the legacy data object 518 and the distribution channel indicator, the legacy data object 518 is stored in the repository 128 at block 315. Returning to FIG. 3, the server is then configured, at block 325, to determine whether to initiate any of a variety of processing mechanisms with respect to one or more of the data objects stored in the repository 128.

The determination at block 325 can be based on various factors, and numerous examples of processing mechanisms may be initiated in response to such determinations. Examples of processing mechanisms include a data feed, which may also be referred to as a publication mechanism. For example, following the creation of a data object in the repository 128, or the application of an update to a data object in the repository 128, the server 124 can be configured to initiate a publication mechanism to inform other entities in the system 100 (e.g. one or more of the provider subsystems 108) of the changes made to the data record. Such a publication mechanism may also be initiated periodically, and the determination at block 325 can therefore include a determination of whether a predetermined period of time since a previous publication has elapsed.

Another example of a processing mechanism is retrieving a data object from the repository 128 and providing the data object to another component of the system 100 (e.g. a client subsystem 104) in response to a request from that component. This example in particular will be discussed in greater detail further below.

Other examples of processing mechanisms that can be initiated at block 325 include processing requests to modify or delete data objects in the repository 128, indexing processes performed on the repository 128, and the like.

At block 325, therefore, the server 124 can assess any of a variety of conditions to determine whether to initiate at least one processing mechanism. If the determination at block 325 is negative, the server 124 returns to block 305 to await further content. The server 124 can also repeat the performance of block 325. As noted above, the performance of blocks 305-320 and that of blocks 325 onwards need not be coupled. That is, the conditions that lead to an affirmative determination at block 325 need not be associated directly with the most recently received data object.

When the determination at block 325 is affirmative for a given data object, the server 124 proceeds to block 330. At block 330 the server 124 determines whether the data object is associated with a non-legacy distribution channel indicator. In the present example, the server 124 determines at block 330 whether the data object includes a distribution channel indicator field 532, as illustrated in FIG. 5. In other words, at block 330 the server 124 determines whether the data object for which a processing mechanism was initiated at block 325 contains legacy content or non-legacy content.

When the determination at block 330 is affirmative, indicating that the data object (although a legacy data object structurally, as discussed in connection with block 320) contains non-legacy data, the server proceeds to block 332. At block 332, the server 124 determines whether an adjustment is needed to at least one legacy processing mechanism triggered at block 325. The server 124 can store indicators of legacy processing mechanisms that may be applied without adjustment to data objects, regardless of the type of content stored therein. If the processing mechanism triggered at block 325 does not appear in the above indicators, the determination at block 332 is affirmative, and the server 124 proceeds to block 335.

At block 335 the server 124 adjusts the processing mechanism initiated at block 325 according to the distribution channel indicator. That is, the server 124 selects an adjusted processing mechanism, which may differ (but is not required to differ) from the processing mechanism initiated at block 325. When the determination at block 332 is negative, indicating that no adjustment is necessary, the server 124 instead proceeds to block 340, discussed below.

Some processing mechanisms, such as the above-mentioned publication or feed mechanism, may not be appropriate for non-legacy content, but are nevertheless triggered at block 325 in response to an update to the repository 128, because such processes may be automatically triggered in response to any update to legacy data objects. Adjustment can therefore include suppression of the processing mechanism initiated at block 325, such that the adjusted mechanism selected at block 335 is simply a null process (i.e. an absence of further processing). In other cases, the selected adjusted processing mechanism may be analogous to the processing mechanism initiated at block 325, but may differ in at least one particularity.

Adjustments to processing mechanisms may be reflected in adjustment configuration data stored at the server 124, e.g. in the instructions of the application 212. For example, the adjustment configuration data can map legacy processing mechanisms to adjusted processing mechanisms. Table 1 illustrates example adjustment configuration data.

TABLE 1

Processing Mechanism Adjustment Configuration

| Legacy Function | Non-Legacy Function |
| --- | --- |
| Provider feed | N/A |
| View Security | View Security |
| GDS Modify Security | NDC Modify Security |

As seen in Table 1, a provider feed processing function (i.e. the above-mentioned publication function) is mapped to no non-legacy function. Therefore, when the provider feed legacy processing mechanism is initiated at block 325, at block 335 the selected adjustment to that processing mechanism is to suppress the legacy processing mechanism, and performance of the method 300 simply terminates.

Table 1 also illustrates a view security processing function, employed to determine whether to grant a request (e.g. by a client subsystem 104 or component thereof) to retrieve a data object from the repository 128 for display. The example adjustment configuration data of Table 1 indicates that at block 335 the same processing function is employed (i.e. no adjustment is made, and the determination at block 332 for the "View Security" mechanism would be negative). In other examples, however, as in the third row of Table 1, different security policies may be applied, e.g. in the case of a request to modify a data record. For example, modifying a price of an item in legacy content may be permitted, but such a modification may not be permitted for non-legacy content.

When the determination at block 330 is negative, indicating that the data object for which a processing mechanism was initiated at block 325 contains legacy content, the server 124 proceeds to block 340, and continues with the application of the legacy processing mechanism. Thus, for example, in the case of the publication function mentioned above, at block 340 the server 124 simply proceeds with the publication function for legacy content (whereas for non-legacy content the publication function is suppressed at block 335).

As noted earlier, request handling is a specific case of a processing mechanism initiated at block 325. For example, the affirmative determination at block 325 can result from the receipt of a request for content at block 345. The request received at block 345 may include a record identifier, and initiates the performance of at least one processing mechanism, such as a view security mechanism to determine whether to grant access to the data object. At block 330 the server 124 determines whether the requested data object contains legacy or non-legacy data, and proceeds to block 335 or 340 according to the distribution channel indicator. A response is generated and transmitted to the request at block 350 based on the selected processing mechanism (whether adjusted at block 335, or unadjusted at block 340).

Turning to FIG. 6, an example performance of blocks 345, 325, 330, 335 and 350 is illustrated. In particular, the engine 122 of the client subsystem 104 sends a request 600 to the server 124 for the data object "ABCDEF" (i.e. the data object 518 shown in FIG. 5). Of particular note, the request is received at the server 124 via a legacy interface. As mentioned earlier, the engine 122 may be configured only to implement the GDS standard, rather than the NDC standard. Therefore, the request 600 (and indeed, any requests for data objects generated by the engine 122) employs message syntax, sequencing and the like that is defined by the GDS distribution channel.

Having received the request 600 at block 345, the server 124 initiates a view security process (i.e. an affirmative determination at block 325) and proceeds to block 330. At block 330, the determination is affirmative, because the data object 518 includes the distribution channel indicator field 532, indicating that the data object 518 contains non-legacy content with which the engine 22 is not compatible (in the absence of the functionality discussed herein). The server 124 therefore proceeds to block 335 and selects an adjusted processing mechanism according to the adjustment configuration data. In the present example, Table 1 indicates that no adjustment is required for retrieval and display of a data object. In other embodiments, however, Table 1 may indicate that a different set of security policies are to be applied for viewing of non-legacy content.

At block 350, the data object 518 is returned, via the legacy interface (i.e. employing GDS syntax and message sequencing in this example), to the engine 122. In some examples, the distribution channel indicator field 532 can be omitted, and the response therefore contains a modified version 518' of the data object 518. In other examples, however, the entire data object 518 is transmitted at block 350. The adjustment configuration data itself can include configuration parameters indicating, for example, whether the field 532 is to be included when returning the data object 518 to the engine 122.

Those skilled in the art will appreciate that in some embodiments, the functionality of the application 212 may be implemented using pre-programmed hardware or firmware elements (e.g., application specific integrated circuits (ASICs), electrically erasable programmable read-only memories (EEPROMs), etc.), or other related components.

The scope of the claims should not be limited by the embodiments set forth in the above examples, but should be given the broadest interpretation consistent with the description as a whole.

The invention claimed is:

1. A method for legacy-based access to non-legacy data, the method comprising:
   storing, in a repository, a plurality of legacy data objects each containing legacy content;
   receiving, at an intermediation server, a further data object for storage in the repository;
   determining, at the intermediation server, that the further data object is a non-legacy data object containing non-legacy content;
   in response to the determining:
     (i) generating a further legacy data object containing the non-legacy content,
     (ii) storing the further legacy data object in the repository with the plurality of legacy data objects, and
     (iii) storing, in association with the further legacy data object, a non-legacy distribution channel indicator;
     (iv) in response to storing the further legacy data object and the non-legacy distribution channel indicator, suppressing a legacy processing mechanism according to adjustment configuration data stored at the intermediation server;
   receiving from a client subsystem, via a legacy interface, a request for the non-legacy content; and
   in response to the request:
     (i) selecting a processing mechanism corresponding to the request,
     (ii) selecting, based on the adjustment configuration data, an adjustment to the processing mechanism, and
     (iii) according to the adjustment, retrieving and sending the further legacy data object containing the non-legacy content, via the legacy interface.

2. The method of claim 1, wherein storing the non-legacy distribution channel indicator includes storing the non-legacy distribution channel indicator in a field of the further legacy data object.

3. The method of claim 1, wherein selecting the adjustment includes:
   determining whether the legacy data object is associated with the non-legacy distribution channel indicator;
   when the determination is affirmative, selecting an alternative processing mechanism distinct from the legacy processing mechanism.

4. The method of claim 3, further comprising: when the determination is negative, initiating the legacy processing mechanism.

5. The method of claim 1, wherein the non-legacy content is obtained via New Distribution Capability (NDC) messaging, and wherein the legacy data object is obtained via Global Distribution System (GDS) messaging.

6. The method of claim 4, wherein the legacy processing mechanism is a publication mechanism configured to transmit at least a portion of a legacy data object to a further subsystem.

7. The method of claim 1, wherein sending the further legacy data object includes sending the non-legacy distribution channel indicator.

8. The method of claim 1, wherein sending the further legacy data object includes omitting the non-legacy distribution channel indicator.

9. The method of claim 1, wherein the adjustment to the legacy processing mechanism includes applying a non-legacy access restriction to a legacy database.

10. An intermediation server, comprising:
    a memory storing a repository containing a plurality of legacy data objects each containing legacy content;
    a communications interface; and
    a processor connected with the communications interface and the memory, the processor configured to:
      receive, via the communications interface, a further data object for storage in the repository
      determine, at the intermediation server, that the further data object is a non-legacy data object containing non-legacy content;
      in response to the determination:
        (i) generate a further legacy data object containing the non-legacy content,
        (ii) store the further legacy data object in the repository with the plurality of legacy data objects, and
        (iii) store, in association with the further legacy data object, a non-legacy distribution channel indicator;
        (iv) in response to storing the further legacy object and distribution channel indicator, suppress a legacy processing mechanism according to adjustment configuration data stored in the memory:
      receive from a client subsystem, via a legacy interface, a request for the non-legacy content; and
      in response to the request:
        (i) select a processing mechanism corresponding to the request,
        (ii) select, based on adjustment configuration data, an adjustment to the processing mechanism, and
        (iii) according to the adjustment, retrieve and send the further legacy data object containing the non-legacy content, via the legacy interface.

11. The intermediation server of claim 10, wherein the processor is configured, in order to store the non-legacy distribution channel indicator, to store the non-legacy distribution channel indicator in a field of the further legacy data object in the repository.

12. The intermediation server of claim 10, wherein the processor is configured, in order to select the adjustment, to:
    determine whether the legacy data object is associated with the non-legacy distribution channel indicator;
    when the determination is affirmative, select an alternative processing mechanism distinct from the legacy processing mechanism.

13. The intermediation server of claim 12, wherein the processor is further configured to: when the determination is negative, initiate the legacy processing mechanism.

14. The intermediation server of claim 10, wherein the non-legacy content is obtained via New Distribution Capability (NDC) messaging, and wherein the legacy data object is obtained via Global Distribution System (GDS) messaging.

15. The intermediation server of claim 13, wherein the legacy processing mechanism is a publication mechanism configured to transmit at least a portion of a legacy data object to a further subsystem.

16. The intermediation server of claim 10, wherein the processor is configured to send the non-legacy distribution channel indicator with the further legacy data object.

17. The intermediation server of claim 10, wherein the processor is configured to omit the non-legacy distribution channel indicator when sending the further legacy data object.

18. The intermediation server of claim 10, wherein the processor is configured, in order to adjust the legacy processing mechanism, to apply a non-legacy access restriction to a legacy database.

19. A non-transitory computer-readable medium storing computer-readable instructions executable by a processor of an intermediation server to:

store, in a repository, a plurality of legacy data objects each containing legacy content;

receive, via a communications interface, a further data object for storage in the repository;

determine, at the intermediation server, that the further data object is a non-legacy data object containing non-legacy content;

in response to the determination:
 (i) generate a further legacy data object containing the non-legacy content,
 (ii) storing the further legacy data object in the repository with the plurality of legacy data objects, and
 (iii) store, in association with the further legacy data object, a non-legacy distribution channel indicator;
 (iv) in response to storing the further legacy data object and the non-legacy distribution channel indicator, suppress a legacy processing mechanism according to adjustment configuration data stored at the intermediation server;

receive from a client subsystem, via a legacy interface, a request for the non-legacy content; and in response to the request:
 (i) select a processing mechanism corresponding to the request,
 (ii) select, based on the adjustment configuration data, an adjustment to the processing mechanism, and
 (iii) according to the adjustment, retrieve and send the further legacy data object containing the non-legacy content, via the legacy interface.

* * * * *